United States Patent [19]

Lewis

[11] 4,302,215

[45] Nov. 24, 1981

[54] DEPOSIT CONTROL ADDITIVES AND THEIR FUEL COMPOSITIONS

[75] Inventor: Robert A. Lewis, Berkeley, Calif.

[73] Assignee: Chevron Research Company, San Francisco, Calif.

[21] Appl. No.: 960,345

[22] Filed: Nov. 13, 1978

[51] Int. Cl.³ .............................................. C10L 1/22
[52] U.S. Cl. ........................................ 44/71; 44/70; 260/463
[58] Field of Search ....................... 44/70, 71; 260/463

[56] References Cited

U.S. PATENT DOCUMENTS

| | | | |
|---|---|---|---|
| 2,844,449 | 7/1958 | Dille et al. | 44/70 |
| 2,844,451 | 7/1958 | Alpert et al. | 44/70 |
| 2,885,274 | 5/1959 | Heisler et al. | 44/71 |
| 2,921,955 | 1/1960 | Newman et al. | 44/71 |

Primary Examiner—Patrick Garvin
Assistant Examiner—Y. Harris-Smith
Attorney, Agent, or Firm—D. A. Newell; S. R. LaPaglia; A. S. Zavell

[57] ABSTRACT

Hydrocarbyl carbonates and their fuel compositions are provided. The hydrocarbyl carbonates are deposit control additives in gasoline compositions.

9 Claims, No Drawings

DEPOSIT CONTROL ADDITIVES AND THEIR FUEL COMPOSITIONS

BACKGROUND OF THE INVENTION

This application relates to hydrocarbyl carbonates which function as effective deposit control additives in fuels.

FIELD OF THE INVENTION

Deposit control additives in non-leaded hydrocarbonaceous fuels for internal combustion engines are often found to contribute to the octane requirement increase, "ORI", of the engine. ORI is believed to be caused by combustion chamber deposits which slowly accumulate over the early use period of the engine. Eventually, it may be difficult to provide fuel of sufficiently high octane to prevent knocking and the concomitant engine damage it causes.

Octane requirement increase, measured in a particular engine using commercial gasolines will vary, at equilibrium, from 5 to 6 octane units to as high as 12 to 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts that the ORI problem, while present with leaded gasolines, is much more serious with unleaded fuel because of the different nature of the deposits formed with the respective fuels, the size of octane increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, some of the presently used nitrogen-containing deposit control additives with mineral oil or polymer carriers appear to contribute significantly to the ORI of engines operated on unleaded fuel.

It is, therefore, highly desirable to provide fuel compositions containing deposit control additives which effectively control deposits in intake systems (carburetor, valves, etc.) of engines operated with fuels containing them, but which do not contribute to the combustion chamber deposits which cause increased octane requirements. Although, in general, deposit control fuel additives are not believed to be useful dispersants for lubricating oil compositions, certain carbonates of the present invention are useful in this regard.

DESCRIPTION OF THE PRIOR ART

U.S. Pat. Nos. 2,844,448–451 describe certain polyether carbonates having deposit control activity in fuel compositions.

SUMMARY OF THE INVENTION

Hydrocarbyl carbonates comprising a hydrocarbyl group of from 500 to 10,000 molecular weight and a hydroxyl and/or tertiary amino-containing group of from about 80 to about 700 molecular weight are provided which have good deposit control activity in fuel compositions without contributing to deleterious ORI to the same extent as currently used deposit control additives derived from amine.

DETAILED DESCRIPTION OF THE INVENTION

The hydrocarbyl carbonate of the present invention consists of a high-molecular-weight hydrocarbyl moiety and a hydroxyl and/or tertiary amino-containing moiety bonded through a carbonate linkage, i.e., —OC(O)O—. The hydrocarbyl component of the carbonate and the hydroxyl and/or amino-containing moiety of the carbonate are selected to provide deposit control activity without deleterious octane requirement increase.

Preferred Hydrocarbyl Components

Hydrocarbyl, as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic or acetylenic, particularly acetylenic unsaturation. The hydrocarbyl substituents will have average molecular weights in the range of about 500 to 10,000, more usually in the range of about 800 to about 2000. The hydrocarbyl will preferably be aliphatic, having from 0 to 2 sites of unsaturation, more usually 0 to 2 sites of ethylenic unsaturation, and preferably 0 to 1 site of ethylenic unsaturation. The hydrocarbyl group is preferably derived from a polyolefin, in particular, an epoxidized polyolefin. The polyolefin itself may be derived from olefins from 2 to 6 carbon atoms (preferably ethylene being copolymerized with an olefin of at least 3 carbon atoms), or from a high-molecular-weight petroleum-derived hydrocarbon. Polyisobutylene is the most preferred source of the hydrocarbyl group. Illustrative sources for the high-molecular-weight hydrocarbons from petroleum mineral oils are naphthenic bright stocks. For the polyolefin, illustrative polymers include polypropylene, polyisobutylene, poly-1-butene, copolymers of ethylene and propylene, poly-1-pentane, poly-4-methyl-1-pentane, poly-3-methylbutene-1, etc.

Preferred Hydroxy and/or Tertiary Amino-Containing Component

The preferred hydroxy and/or tertiary amino-containing component of the present invention is derived from a polyol, an amino alcohol or a polyamino polyol.

The polyols, amino alcohols and polyamino polyols which find use within the scope of the present invention have molecular weights in the range of from about 80 to about 700, usually contain from about 4 to 40 carbon atoms, preferably from 4 to about 20 carbon atoms, and include substituted polyols, substituted amino alcohols and substituted polyamino polyols wherein the substituents are selected from hydrogen, hydrocarbyl groups of from 1 to about 10 carbon atoms, acyl groups of from 2 to about 10 carbon atoms and monoketo, monohydroxy, mononitro, monocyano, lower alkyl and lower alkoxy derivatives of the aforementioned hydrocarbyl groups of from 1 to about 10 carbon atoms and the aforementioned acyl groups. "Lower", as used in terms such as lower alkyl or lower alkoxy, means a group containing from 1 to about 6 carbon atoms. The provision is made that all amine nitrogen atoms in said amino alcohols and polyamino alcohols are tertiary amine nitrogen atoms. This provision precludes the formation of carbamates which are not included within the scope of this invention.

Such polyols are exemplified by alkanols such as trimethylolpropane (2-ethyl-2[hydroxymethyl]-1,3-propanediol), pentaerythritol, 1,3,5-cyclohexanetriol, glycerol, etc.; sugars such as glucose, fructose, mannose, etc.; such amino alcohols are exemplified by tris-(hydroxymethyl)aminomethane, N,N-dimethylaminoethanol, triethanolamine, tripropanolamine, etc.; polyamino alcohols are exemplified by N,N,N',N'-tetra(2-hydroxypropyl)-ethylenediamine, per-(hydroxyethyl)-tetraethylenepentamine, etc.; and such polyhydroxy polyether amines as are prepared by condensing alkylene oxides onto ammonia, primary or secondary amines, such as 2-hydroxy(2-ethoxy[2-ethoxyethyl])-N,N-dimethylamine, bis-N,N-(2-hydroxy[2-propoxypropyl])-ethylamine, etc.

Preferred Hydrocarbyl Carbonate

The hydrocarbyl carbonate of the present invention consists of the previously described hydrocarbyl component bonded through a carbonate linkage, i.e., —OC(O)O—, to a hydroxyl and/or tertiary amino-containing group.

A particularly preferred hydrocarbyl carbonate fuel or lubricating oil additive of the present invention, which is preferred for its detergent and dispersant activity without deleterious ORI, is the monocarbonate, ROC(O)OR', where R is the previously described hydrocarbyl component, and —OR' is the previously described component selected from hydroxyl and/or tertiary amino-containing groups. R is, for example, a polyisobutenyl group of 800–2000 molecular weight and —OR' is, for example, (—OCH$_2$)C(C$_2$H$_5$)(CH$_2$OH)$_2$ derived from trimethylolpropane, [—OCH(CH$_3$)CH$_2$]N[CH$_2$CH(CH$_3$)OH]CH$_2$CH$_2$N[CH$_2$CH(CH$_3$)OH]$_2$ derived from N,N,N',N'-tetra(2-hydroxypropyl)ethylenediamine, or (—OC$_2$H$_4$)N(CH$_3$)$_2$ derived from dimethylaminoethanol. A less preferred hydrocarbyl carbonate fuel or lubricating oil additive of the present invention is the hydrocarbyl bis-carbonate, ROC(O)OR"OC(O)OR, wherein R is the aforementioned hydrocarbyl group and —OR"O— is the previously described component selected from hydroxyl and/or tertiary amino-containing groups. R is, for example, a polyisopropenyl group of 500–10,000 molecular weight and —OR"O— is, for example, (—OCH$_2$)C(C$_2$H$_5$)(CH$_2$OH)(CH$_2$O—) derived from trimethylolpropane, or (—OC$_2$H$_4$)N(C$_2$H$_4$OH)(C$_2$H$_4$O—) derived from triethanolamine.

Method of Preparation of Hydrocarbyl Carbonate

In the preferred method of preparation, a monohydroxy-substituted hydrocarbon, i.e, ROH, wherein R is the previously described hydrocarbyl group, is reacted with phosgene to produce the chloroformate, ROC(O)Cl. The chloroformate is then reacted with a polyol, amino alcohol or polyamino polyol to produce the hydrocarbyl carbonate of the present invention. Preferably, excess amounts of polyol, amino alcohol or polyamino polyol are used to minimize the formation of bis-carbonate. The latter reaction may also be carried out in the presence of HCl scavengers, such as, pyridine, triethylamine, CaO, NaOH, etc. The aforementioned monohydroxy-substituted hydrocarbon, ROH, is preferably produced by the epoxidation of an olefin-containing hydrocarbon, preferably a polyolefin containing at least one ethylenically unsaturated terminal bond. The epoxide is then reduced to an alcohol before chloroformylation. Alternatively, the aminoalcohol may be chloroformylated and reacted with the monohydroxy-substituted hydrocarbon, ROH.

The carbonates may be prepared in a variety of inert solvents, such as aromatic hydrocarbons, e.g., benzene, toluene, xylenes, etc.; ethers, such as diethyl ether or tetrahydrofuran; or aliphatic solvents, such as hexane and cyclohexane, if the reactants are soluble therein. Reaction temperatures may range from about 0° C. to the boiling point of the solvent chosen. Higher temperatures and longer reaction times are generally necessary if an acid scavenger is not used, so the presence of such scavengers as pyridine or triethylamine is preferred.

Fuel Compositions

The carbonate of this invention will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 500 ppm of carbonate per part of base fuel is needed to achieve the best results. When other detergents are present, a lesser amount of carbonate may be used. For performance as a carburetor detergent only, lower concentrations, for example 30 to 70 parts per million, may be preferred.

The deposit control additive may be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the concentrate, the amount of the additive will ordinarily be at least 10% by weight and generally not exceed 70% by weight, and preferably from 10 to 25 weight percent.

In gasoline fuels, other fuel additives may also be included such as antiknock agents, e.g., methylcyclopentadienyl manganese tricarbonyl, or other dispersants or detergents such as various substituted succinimides, amines, etc. Also included may be lead scavengers such as aryl trihalides, e.g., dichlorobenzene or alkyl halides, e.g., ethylene dibromide. Additionally, antioxidants, metal deactivators and demulsifiers may be present.

A particularly useful additive is a fuel-soluble carrier oil. Exemplary carrier oils include polyolefins such as polybutene or polypropylene; other synthetic lubricants or lubricating mineral oil. When used, these oils are believed to act as a carrier for the additive and assist in removing and retarding deposits. They are employed in amounts from about 0.005 to 0.5% by volume, based on the final gasoline composition. Preferably 100–5000 ppm by weight of a fuel-soluble polyolefin is used.

Although it is not generally correct that fuel deposit control additives can be used as dispersant lubricating oil additives, hydrocarbyl carbonates do find additional use as dispersant additives in lubricating oils. Suitable oils are any commonly employed oils including paraffinic, naphthenic, halo-substituted hydrocarbons, synthetic esters or combinations thereof. Oils of lubricating viscosity have viscosities in the range of 35 to 50,000 SUS at 100° F., and more usually from 50 to 10,000 SUS at 100° F. The amount of the carbonate of this invention which is incorporated into the lubricating oil to provide the effective amount necessary for dispersancy varies widely with the particular carbonate used as well as the use intended for the lubricating oil composition. Other conventional additives which can be used in combination with the carbonate include ashless dispersants such as the type disclosed in U.S. Pat. Nos. 3,172,892, 3,219,666 and 3,381,022; neutral and basic calcium, barium and magnesium petrosulfonates or alkyl phenates; oxidation inhibitors, antifoam agents, viscosity index improvers, pourpoint depressants, and the like, such as chlorinated wax, benzyl-disulfide, sulfurized sperm oil, sulfurized terpene; phosphorus esters such as trihydrocarbon phosphites and phosphates; metal thiocarbamates such as zinc dioctyldithiocarbamate; metal phosphorus dithioates such as zinc dioctylphosphorodithioate; polyisobutene having an average molecular weight of 100,000; etc. In general, the lubricating oil compositions will contain from about 0.01 to about 10% or 20% weight of said oil-soluble carbonate. Usually, the lubricating oil composition of the invention will contain from about 0.5 to about 10% weight, and more usually from about 1 to about 8%, of the hydrocarbyl carbonate. The lubricating oil compositions of the invention are useful for lubricating internal combustion engines. The lubricating oils not only lubricate the engine, but, because of their dispersancy properties, help maintain a high degree of cleanliness of the lubricated parts.

In another embodiment of this invention, lubricating oil additive concentrates are provided comprising from about 90 to about 20 weight percent of an inert stable oleophilic solvent such as an oil of lubricating viscosity and from about 10 to about 80 weight percent of the hydrocarbyl carbonates of this invention. Typically, the concentrates contain sufficient diluent to make them easy to handle during shipping and storage. Preferably, the diluent is an oil of lubricating viscosity so that the concentrate may be readily mixed with lubricating oils to prepare lubricating oil compositions. Suitable lubricating oils which can be used as diluents typically have viscosities in the range from about 35 to about 1000 Saybolt Universal Sounds (SUS) at 100° F., although any oil of lubricating viscosity can be used.

EXEMPLIFICATION

EXAMPLE 1

Preparation of Polybutene Epoxide (I)

Polybutene (molecular weight approximately 1400, 990 g, 0.705 mol) was dissolved in methylene chloride (2 liters) in a 5-liter, 3-neck flask equipped with an addition funnel, mechanical stirrer, thermometer and reflux condensor. To the flask was added, dropwise, a mixture of 40% peracetic acid (134 g, 0.18 mol) and sodium acetate (14.85 g, 0.18 mol). The temperature rose to about 35° C. during the 20-minute addition. The mixture was stirred overnight, and extracted with saturated sodium bicarbonate (500 ml, then 2×200 ml). The aqueous phase was basic. The organic phase was dried over magnesium sulfate, filtered, and solvent was removed on a rotary evaporator. The resulting epoxide (I) was reduced to provide the alcohol.

EXAMPLE 2

Preparation of Polybutene Alcohol (II)

Anhydrous aluminum chloride (57 g, 0.428 mol) was slurried in anhydrous ether (300 ml) and lithium aluminum hydride (4.1 g, 0.107 mol) in ether was added with stirring. After 1 hour, polybutene epoxide (I) (305 g, 0.214 mol) in ether (1 liter) was added in a slow stream. The mixture was stirred overnight. 10% sodium tartrate (150 ml) was added, and the ether layer was dried over magnesium sulfate, filtered, and freed of solvent on the rotary evaporator. The infrared spectrum showed hydroxyl absorptions at 3600 and 3350 cm$^{-1}$. The 3,5-dinitrobenzoate derivative had a molecular weight of 1870, and contained 0.94% nitrogen (theory, 1.50%). This alcohol was used to prepare the chloroformate.

EXAMPLE 3

Preparation of Polybutene Chloroformate (III)

A 3-neck flask containing toluene (1 liter) was cooled to 5° C., and phosgene (30 g, 0.3 mol) was added. Polybutene alcohol (II) (300 g, 0.213 mol) in toluene (1 liter) was added in a slow stream, the solution was stirred for 2 hours at 5°–10° C., and then warmed to room temperature. The mixture was allowed to stand overnight under a nitrogen atmosphere. It was then flushed for 4 hours with nitrogen to drive out hydrogen chloride and excess phosgene. Solvent was removed from a small aliquot, and the infrared spectrum showed absorptions at 1775, 1160 and 840 cm$^{-1}$. Alcohol bands present in (II) were absent. The reaction mixture was used to prepare carbonates without further purification.

EXAMPLE 4

Preparation of Polybutene Carbonates

Trimethylol propane (38 g, 0.284 mol) and pyridine (22.4 g, 0.284 mol) were combined with benzene (200 ml), and the benzene solvent (15 ml) was distilled to remove trace water. Chloroformate (III) (100 g, about 0.07 mol) in toluene as prepared above was added dropwise to the alcohol solution, with rapid stirring. After stirring overnight, the lower phase of the reaction mixture was removed, and the upper phase was washed with water (200 ml). The aromatic solvent was removed on the rotary evaporator and the residue was dissolved in pentane (1 liter) and was washed with water (3×100 ml) to remove pyridine and unreacted alcohol. Ethanol was used to break emulsions. Solvent was removed, leaving the product (IV) as a yellow oil. The infrared spectrum showed a broad carbonyl band at 1748 cm$^{-1}$, and a broad hydroxyl absorption at 3400 cm$^{-1}$. In like manner, the carbonates of 1,1′,1″-nitrilotri-2-propanol (V), N,N,N′,N′-tetra-(2-hydroxypropyl)-ethylenediamine (VI) (available from BASF Wyandotte Corp. as Quadrol) and tetra-(2-hydroxyethyl)-ethylenediamine (VII) were prepared. Analytical data for these compounds are shown in Table I.

TABLE I

| Compound | Analytical Results | | | |
|---|---|---|---|---|
| | IV | V | VI | VII |
| Molecular Weight | 1550 | 1435 | 1430 | 1361 |
| Nitrogen, % | — | 0.55 | 0.79 | 0.51 |
| Oxygen, % | 3.08 | 3.34 | — | — |
| % Basic Nitrogen | — | 0.35 | — | — |
| Hydroxyl Number, mg KOH/g | 87 | | | |

Thermogravimetric analysis of the additives (Table II), run at 300° C. in air (60 ml/min) for 30 minutes, revealed that the carbonates decompose cleanly, leaving nearly no residue. Polybutene amines and succinimides do not decompose as readily. This test has been shown to correlate with the tendency of additives to form deposits in the combustion chamber and, hence, to contribute to ORI.

TABLE II

| TGA Analysis of Additives | |
|---|---|
| Compound | % Weight Remaining |
| IV | 2.0 |
| VII | 3.6 |
| Commercial Polybutene Amine | 60 |
| Commercial Polybutene Succinimide | 70 |

Table III shows comparative ORI data, generated in a single-cylinder engine.

A laboratory engine test was used to evaluate the tendency of the additives to contribute to ORI. The test engine is a CLR single-cylinder, balanced, high-speed, four-cycle engine designed primarily for oil test and research work. It is manufactured by the Laboratory Equipment Corporation of Mooresville, Indiana. The major engine dimensions are:

| | |
|---|---|
| Bore | 3.80 in. |
| Stroke | 3.75 in. |
| Displacement | 42.5 cu.in. |
| Compression Ratio | 8:1 |

The carburetor, intake manifold, and distributor were slightly modified to facilitate the test procedure. These modifications were made in order to make the engine's ORI characteristics comparable to modern-day automobiles. The test procedure involves engine operation for 100 hours (24 hours a day) on a prescribed load and speed schedule representative of typical vehicle driving conditions. ORI is the difference in fuel octane required for knock-free operation of the engine before and after 100 hours operation using the additized fuel.

TABLE III

| Single-Cylinder ORI Evaluation, 100-Hour Test | | |
|---|---|---|
| Compound | Concentration (ppm) | ORI |
| IV | 300 | 4.7,5.2 |
| V | 300 | 5.0 |
| Commercial Polybutene Amine | 300 | 6.0 |
| None | — | 3.7 |

Valve performance data, showing that this class of additives is effective at controlling intake valve deposits, are shown in Table IV. In carrying out the tests, a Waukesha CFR single-cylinder engine is used. The run is carried out for 15 hours, at the end of which time the intake valve is removed, washed with hexane and weighed. The previously determined weight of the clean valve is subtracted from the weight of the valve. The difference between the two weights is the weight of the deposit, with a lesser amount of deposit measured connoting a superior additive. The operating conditions of the test are as follows: water jacket temperature 100° C. (212° F.); manifold vacuum of 12 in Hg; intake mixture temperature of 50° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table IV. The base fuel tested in the above test is a regular-octane unleaded gasoline containing no fuel deposit control additive. The base fuel is admixed with the deposit control additives (in the tables, the additives are identified by Roman numeral compound numbers from the foregoing Examples).

TABLE IV

| Single-Cylinder Intake Valve Performance | | |
|---|---|---|
| Compound | Concentration* | Valve Deposit, mg |
| IV | 300 ppm | 26 |
| Commercial Polybutene Amine | 300 ppm | 2 |
| None | — | 130 |

*All additive runs contained 1000 ppm of carrier oil.

The preferred reactants, carbonates, processes and compositions of the present invention have been described with a view to providing the most effective fuel and lubricating oil additives, not only for lower ORI, but with a view to providing properties dealing with other problems, such as deposit formation. While ORI is the major problem confronted by the additives of this invention, other desirable properties or undesirable problems of fuel and lubricating oil compositions include sludge formation, detergency, viscosity, dispersancy, cetane, water tolerance, rust, oxidation, compatibility and interaction with motor oil or fuel additives.

Although many specific embodiments of the invention have been described in detail, it should be understood that the invention is to be given the broadest possible interpretation within the terms of the following claims.

What is claimed is:

1. A hydrocarbyl carbonate comprising a hydrocarbyl group of from 500 to 10,000 molecular weight and the hydroxyl and/or a tertiary amino-containing group of from about 80 to about 700 molecular weight, wherein said hydrocarbyl group is a polyalkylene group comprised of $C_2$–$C_6$ alkylene units.

2. A hydrocarbyl carbonate according to claim 1 wherein said polyalkylene group is a polybutylene or polypropylene group.

3. A hydrocarbyl carbonate according to claim 1 wherein said hydroxyl and/or tertiary amino-containing group is derived from a polyol, amino alcohol or polyamino polyol.

4. A hydrocarbyl carbonate according to claim 1 wherein said hydrocarbyl group is of from 800 to 2000 molecular weight.

5. A hydrocarbyl carbonate according to claim 1 wherein said hydroxyl and/or tertiary amino-containing groups are derived from trimethylolpropane, triethanolamine, N,N,N',N'-tetra(2-hydroxypropyl)ethylenediamine, and dimethylaminoethanol.

6. A fuel composition comprising a major amount of hydrocarbons boiling in the gasoline range and from 30 to 2000 ppm of one or more compounds of Claims 1, 3, 4, 5 or 6.

7. A concentrate comprising an inert stable oleophilic organic solvent boiling in the range of about 150° to 400° F. and from 10 to 25 weight percent of the compound of claim 1.

8. A concentrate according to claim 7 where there is also present 5 to 80 weight percent of a poly(oxyalkylene) alcohol, glycol or polyol.

9. The fuel composition of claim 6 which contains in addition from 100 to 5000 ppm of a fuel-soluble poly(oxyalkylene) alcohol, glycol or polyol.

* * * * *